UNITED STATES PATENT OFFICE.

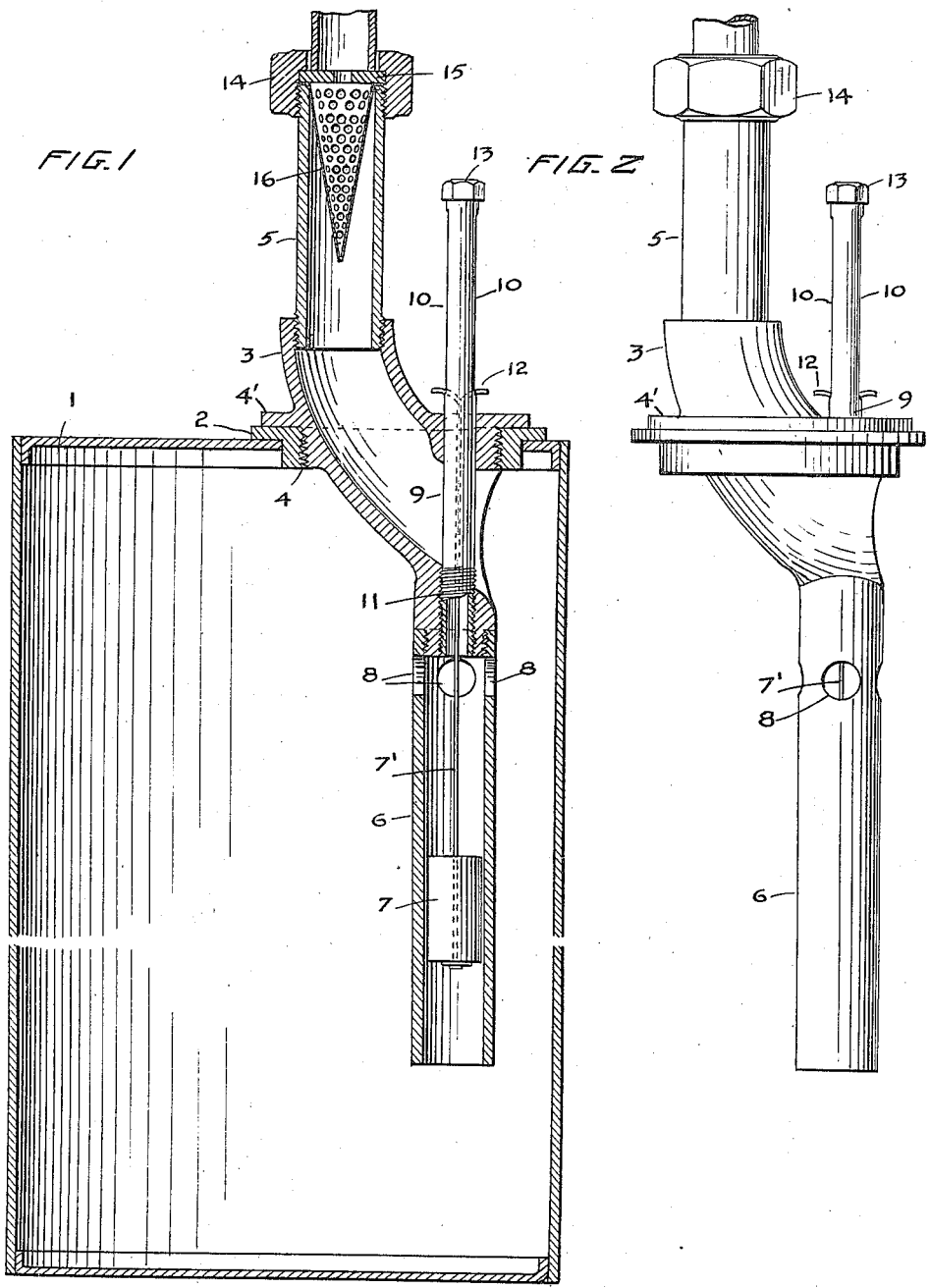

RALPH P. STEVENS, OF PALO ALTO, CALIFORNIA.

TANK-FILLER.

1,192,134.  Specification of Letters Patent.  Patented July 25, 1916.

Application filed January 8, 1915. Serial No. 1,165.

*To all whom it may concern:*

Be it known that I, RALPH P. STEVENS, a citizen of the United States, residing at Palo Alto, in the county of Santa Clara, State of California, have invented a new and useful Tank-Filler, of which the following is a specification in such full and clear terms as will enable those skilled in the art to construct and use the same.

This invention relates to a combination tank filler, float and air escape, the object being to produce a device capable of being permanently secured to the tank or removable therefrom with means to protect the float from injury when the filler is being removed from or inserted in the filling opening of a tank.

Another object of the invention is to provide a tank filler of such construction as to make it unnecessary to take the cap off the tank each time it is to be filled, while at the same time the liquid therein cannot easily escape.

It will be understood that while the filler is particularly applicable to gasolene tanks for automobiles and other gas engines that it may be used for filling any tank with any liquid equally well.

An embodiment of the invention is shown in the drawing in which the same reference numeral is applied to the same portion throughout, but I am aware that there are many modifications thereof.

Figure 1 is a vertical sectional view through the tank and filling device, and Fig. 2 is a side elevation of the complete device.

The numeral 1 represents the tank in the top of which is secured the flanged threaded bushing 2. The filler comprises a fitting or casting 3 threaded at 4 to match the bushing 2 and having a flange 4'. The casting is threaded to receive a pipe 5 at the top and at the bottom a pipe 6 is screwed thereon to supply a guide and protecting casing for the float 7. Just at the top of the pipe 6 are several holes 8, one of which is placed just under the stream from the filling pipe. Extending in line with the axis of the pipe 6 through the casting 3 is a small tube 9 having two slots 10, said tube being tightly pushed through the top of the casting and screwed thereinto at 11. The float 7 has a wire rod 7' passing therethrough, the ends of which are turned down oppositely at 12 and extend through the slots in the tube 9 to serve as an indicator to notify the attendant that the tank is nearly full. The tube 9 has a closed cap 13 thereon and the pipe 5 has an open cap 14 which is seated on a soft rubber gasket 15 having a small hole therein to permit the insertion of a funnel or filling spout from a pump.

In order to insure against impurities such as sand, etc., getting into the tank a conical screen 16 may be seated under the gasket 15.

Since one opening is necessary for an air vent and the other is at the top of a tube a considerable height above the top of the liquid in the tank it is unnecessary to completely close either, and the cap 14 is always ready for filling.

In use the liquid rushes past the openings 8 and draws the air in the tank into the tube, whereupon any excess may escape at the slots in the top and the incoming fluid will not be interfered with by the air escaping from the tank.

It is to be noted that the tube 5 may be made of any desired height as well as the tube 10 so that it is unnecessary to disturb cushions and seats if the tank to be filled is below one.

While the float is shown as movable through a short distance only it will be clear that it may be allowed to move the entire depth of the tank if desired without changing the invention in any way.

When the tank is filled so the float touches the lower end of the tube 10 it prevents the fluid from escaping therefrom.

Having thus described my invention what I claim as new and desire to secure by Letters Patent of the United States, is as follows, modifications within the scope of the claim being expressly reserved.

A filling device for tanks comprising a tank plug having a filling and an air escape opening therethrough, an air escape pipe extending through the air escape opening in the tank plug and having its lower end out of the path of the incoming liquid whereby the incoming liquid and escaping air cannot mix, a pipe secured to and depending from the lower side of said tank plug, a float slidable in said pipe, the float pipe having air inlet holes thereinto above the float, and an indicator rod connected with the float and passing out of the air escape pipe and being of such length as to permit the float to close the air escape pipe when the tank is filled up to the desired level.

In testimony whereof I have hereunto set my hand this 2" day of January, A. D. 1915, in the presence of the two subscribed witnesses.

RALPH P. STEVENS.

Witnesses:
C. P. GRIFFIN,
L. H. ANDERSON.